United States Patent
Prust et al.

(10) Patent No.: US 6,481,940 B2
(45) Date of Patent: Nov. 19, 2002

(54) SPINDLE IN A MACHINE TOOL

(75) Inventors: Dirk Prust, Tuttlingen (DE); Rudolf Haninger, Seitingen-Oberflacht (DE)

(73) Assignee: Chiron-Werke GmbH & Co. KG, Tuttlingen (DE)

(*) Notice: Subject to any disclaimer, the term of this patent is extended or adjusted under 35 U.S.C. 154(b) by 0 days.

(21) Appl. No.: 09/891,056

(22) Filed: Jun. 25, 2001

(65) Prior Publication Data

US 2002/0014141 A1 Feb. 7, 2002

(30) Foreign Application Priority Data

Jun. 26, 2000 (DE) .......................................... 100 31 027

(51) Int. Cl.⁷ ............................................... B23C 1/00
(52) U.S. Cl. ....................................... 409/233; 408/240
(58) Field of Search ................................. 409/231, 233; 408/239 R, 240; 279/2.11, 2.12; 82/160

(56) References Cited

U.S. PATENT DOCUMENTS

| | | | |
|---|---|---|---|
| 3,323,419 A | * | 6/1967 | Riedel ..................... 408/239 R |
| 4,997,325 A | * | 3/1991 | Heel et al. .................... 279/57 |
| 5,509,763 A | * | 4/1996 | Reinauer et al. ........ 408/239 R |
| 5,613,929 A | * | 3/1997 | Bayer ......................... 408/238 |
| 5,860,776 A | * | 1/1999 | Sato et al. .................... 408/56 |

FOREIGN PATENT DOCUMENTS

EP     0 787 549 A1    8/1997

* cited by examiner

*Primary Examiner*—Daniel W. Howell
(74) *Attorney, Agent, or Firm*—Weingarten, Schurgin, Gagnebin & Lebovici LLP

(57) ABSTRACT

A spindle (10) is arranged in a machine tool, said spindle (10) having an axis (46), a receptacle arranged in the axis (46) and provided for receiving a shaft of a tool holder (14), and a clamping mechanism for axial fixation of the shaft in the receptacle, the clamping mechanism comprising an axially movable clamping arbor (18) with a circumference, at least one segment (60) arranged at said circumference and having at least a first and a second radial operation position, whereby said at least one segment (60) fixes said shaft positively in said receptacle, when being in the first radial operation position, first guiding means acting between the clamping arbor (18) and the at least one segment (60) such that upon axial movement of the clamping arbor (18) the at least one segment (60) is radially transferred between said first and second radial operation positions, and second guiding means arranged for holding said at least one segment (60) in the defined way when being in said second radial operation position or in any interposition between said first and said second radial operation positions.

18 Claims, 3 Drawing Sheets

SPINDLE IN A MACHINE TOOL

BACKGROUND OF THE INVENTION

1. Field of the Invention

The invention relates to a spindle in a machine tool, with an axis, a receptacle arranged in the axis and provided for a shaft of a tool holder, and a clamping mechanism for axial fixation of the shaft in the receptacle, whereby the clamping mechanism contains an axially movable clamping arbor and at least one segment arranged on a circumference of the clamping arbor, wherein by means of a first guiding acting between the clamping arbor and the segment the at least one segment upon axially shifting of the clamping arbor is radially movable between a first and a second operation position and fixes the shaft, in the first operation position, positively in the receptacle.

2. Related Prior Art

Such a spindle with such a clamping mechanism is known, for example from "FZ" type machining centers of the applicant.

In known clamping mechanisms, the tool holder is inserted, with its outer taper, in a complementary taperbored receptacle of the spindle head. A clamping arbor of the clamping mechanism then enters into a corresponding receptacle in the shaft of the tool holder. The clamping arbor is axially movable via an axially arranged draw-in rod. For clamping of the tool holder, the clamping arbor is in an advanced operation position. On the outer circumference of the clamping arbor, several segments are arranged and distributed over the outer circumference. On the front end, the segments end up in a thickened head, which is, in this operation position, radially on the inner side. If, now, after insertion of the shaft into the receptacle of the spindle head, the draw-in rod is pulled back, the clamping arbor follows. Over a system of slide bevels, the segments then move radially outwards. The thickened heads then grip behind corresponding projecting parts in the receptacle in the shaft of the tool holder, so that the latter is axially positively fixed.

In axial direction behind the clamping arbor there is a crown with several recesses arranged and distributed over the circumference, in which recesses the rear ends of the segments are being held. The crown is in contact with the segments over further guide bevels. If the clamping mechanism is being clamped, the crown is pushed to the back against the force of a spring. If the clamping mechanism is released, the spring presses the crown to the front again, whereby the oblique guiding between crown and segments has the effect that these go back into their radially inner operation position.

In these usual clamping mechanisms, a malfunction can arise due to the fact that the segments, in their radially inner operation position (if the clamping mechanism is released) and in the interpositions between the two operation positions, too, take up undefined positions. This concerns particularly the axially front end of the segments. These can, for example, not return to their radially inner operation position, although the segments are correspondingly moved from the rear end by the crown moving forward under spring force. If, then, the segments are with their front end in an undefined position, there may be malfunctions when the next tool holder is inserted. In particular, an interlocking connection between tool holder and spindle receptacle can be reached, which has the effect that the tool holder already at this moment is entrained with by the receptacle of the spindle rotating with slow coupling speed. But then, the usual connection between a tenon block and a groove between receptacle and tool holder cannot act, so that there is no connection between tool holder and spindle that is able to work.

Apart from that, in such undefined situations a damage of the segments may occur.

SUMMARY OF THE INVENTION

It is therefore an object of the present invention to improve a spindle of the kind mentioned at the outset in such a way that the afore-mentioned problems are eliminated. In particular, a safe coupling of the tool holder into the spindle is to be reached and damages to the elements of the clamping mechanism are to be avoided.

According to the invention, this object is achieved with the spindle of the kind mentioned at the outset by providing a second guiding, by means of which the at least one segment is held in a defined way in the second operation position as well as in any interposition between the first and the second operation positions.

The object underlying the invention is, in that way, completely achieved.

The second guiding guarantees namely that all segments are always in a defined position, i.e. also and particularly in the two operation positions which correspond to the radial end positions. It that way, it is guaranteed that a new tool holder can always be inserted on defined conditions with its shaft into the receptacle of the spindle and, there, after short locating run of the spindle receptacle with the coupling speed, also the interlocking connection between tenon block and groove can be made, so that the tool holder is not only clamped in the correct angle position, but also a reliable non-positive connection in the region of the conical seat between shaft and receptacle is reached.

In a preferred embodiment of the spindle according to the invention, the at least one segment extends alongside the axis, whereby the first guiding engages on both axial ends and the second guiding engages on only one end of the segment.

This embodiment has the advantage that the second guiding can be limited to the necessary minimum and thus an inexpensive and constructively simple solution is possible.

In a preferred development of the embodiment mentioned before, the second guiding acts on the axial end of the at least one segment, which end is facing away from the receptacle.

This embodiment has the advantage that the elements of the second guiding can be put to the rear in the spindle so that no disturbing installations are necessary in the front region.

In a further preferred embodiment of the invention, the first guiding acts, in the second operation position, only at the axial end of the at least one segment, which end is facing away from the receptacle.

This group of features corresponding to the prior art has been successful in praxis and means that the measures provided according to the invention can also be used in other usual clamping mechanisms and can also be, if necessary, retrofitted.

In a further embodiment of the invention it is provided that the guidings are designed as oblique guidings, whereby the at least one segment has preferably an essentially circular-arc shaped form in the radial section and the oblique guidings are formed by conical bevels.

These measures have the advantage that elements known and tested per se can be used for the oblique guidings. By means of a single axially directed force, all guide movements can, in that way, be generated or deviated therefrom.

In the context of the present invention, it is preferred in a kind known per se if a plurality of segments is arranged and distributed over an outer circumference of the clamping arbor.

Then, it is also preferred, in correspondence with known embodiments, that the segments, at their end facing away from the receptacle, are held in a common crown, and that this crown is equipped with first conical bevels which act together with second conical bevels on the segments as part of the first guiding.

It holds true also in this case that it is preferably possible for this invention to keep a plurality of tested constructive elements.

This holds true, amongst other things, for the fact that the crown is axially clamped against the force of a spring, if the clamping arbor is axially shifted, whereby further preferably said spring is relaxed in the second operation position.

Finally, it is provided for such a crown, according to the invention, to have a cylindrical section which holds the spring as well as a plurality of axially protruding shoes, on which these first conical bevels are formed.

In the context of the present invention, it is now further provided for in an advantageous way that in the axial region of the crown a bushing is arranged, which bushing is designed coaxial in relation to this crown, and that this bushing is equipped with third conical bevels which act together with fourth conical bevels on the segments as second guiding.

This measure has the advantage that a particularly compact arrangement is produced, which needs not necessarily be larger in its constructive dimensions than usual arrangements with such a crown. In that way, it is possible to retrofit known systems according to the invention.

In this connection, it is further preferred if the first/second bevel is inclined diametrically to this third/fourth bevel.

This measure has the advantage that by forces, which are directed in different directions, the desired holding of the elements in the interpositions and in the second operation position can be safely ensured.

It is particularly preferred in this connection if the bushing is arranged axially fixed.

This measure has the advantage that a particularly simple sequence of movements is produced, since, for the second guiding, no extra force source or force deviation is required, it is sufficient, rather, if the bushing is supported by the spindle.

According to two preferred variations of these embodiments, the crown can either be radially on the outside and this bushing radially on the inner side or vice versa. Both variations have their own constructive advantages which may be used depending on the case.

In the case of a crown radially on the outside, it is further preferred if the latter is guided in a bore of the spindle, as it is known from other arrangements of that sort.

Further advantages can be taken from the description of the enclosed drawing. It is understood that the features mentioned above and those yet to explained below can be used not only in the respective combinations indicated, but also in other combinations or in isolation, without leaving the context of the present invention.

BRIEF DESCRIPTION OF THE DRAWINGS

Embodiments of the invention are shown in the drawings and will be explained in more detail in the description below. In the drawings.

DESCRIPTION OF A PREFERRED EMBODIMENT

In the figures, 10 designates as a whole a spindle of a machine tool, e.g. a machining center, as it is used to accomplish program controlled drilling, milling and other types of works. Spindle 10 comprises a spindle head 12, which is directed downwards in the embodiment shown. This, however, is not to be understood in a restricting way, as also machine tools with horizontal-axed spindle are known.

Figure 1:
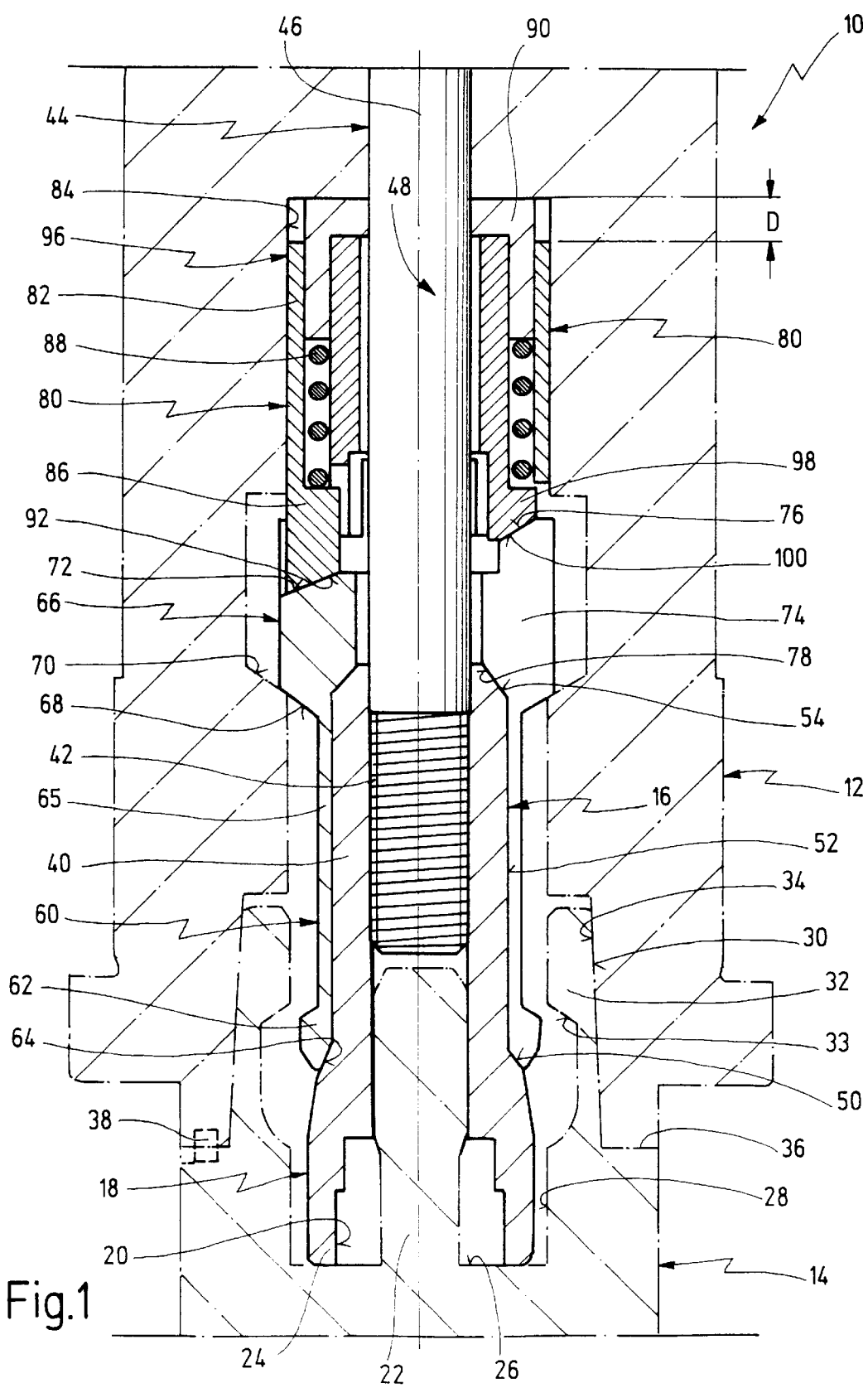
FIG. 1 shows an axial section through an embodiment of a spindle according to the invention, in a first operation position, in which a clamping mechanism of the arrangement is in released state.
Figure 2:
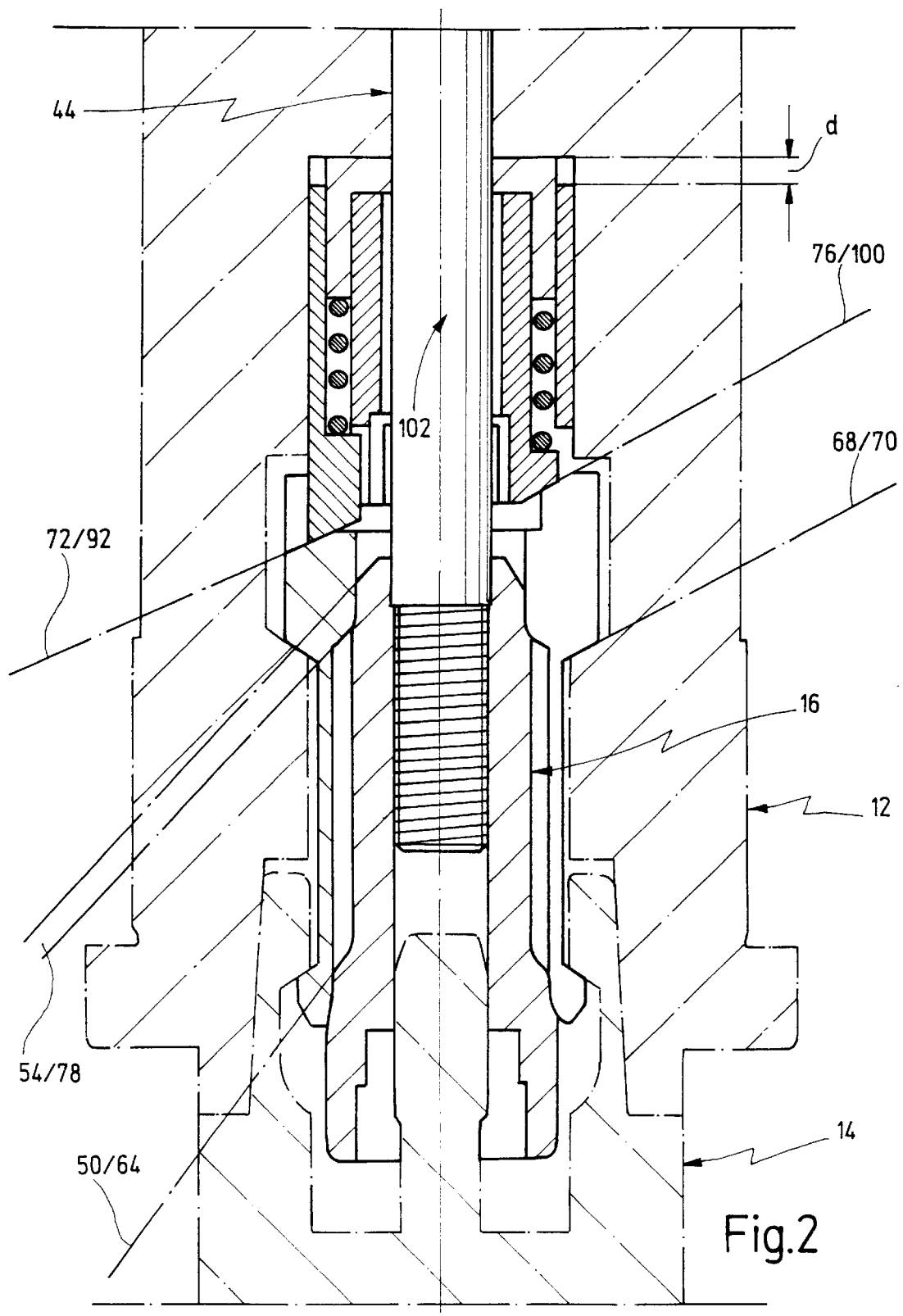
FIG. 2 shows a representation, similar to FIG. 1, for a second operation position, however, in which a tool holder is clamped in the spindle.

In spindle head 12, a tool holder 14 is held, only the upper end of which is indicated in dash-dot in FIG. 1 and 2. A clamping jaw 16, which has on its bottom end a clamping arbor 18, serves for drawing-in and holding tool holder 14 tightly. Clamping arbor 18 has on its bottom end a first receptacle 20, in which a stud 22 of tool holder 14 engages.

In the detaching position shown in FIG. 1, in which there is not yet a firm connection between tool holder 14 and spindle head 12, there is a front end 24 of clamping arbor 18 just in contact with a bottom 26 in a second receptacle 28, which faces upward, of tool holder 14.

Tool holder 14 has on its upper end a shaft with a male taper, male taper 30 forming the conical outer circumference surface of a neck 32. Neck 32 is equipped with an undercut 33.

In a complementary way, spindle head 12 is, at its end directed downward, equipped with a third receptacle, which is formed by a taper bore 34.

If tool holder 14 is inserted, with its shaft and male taper 30, from the bottom in the third receptacle with taper bore 34, same is done until tool holder 14 and spindle head 12 get in touch with each other in a radial plain 36. In the region of this radial plain 36, there is an index application 38 with a tenon block and a groove, the tenon block being positioned on spindle head 12 and the groove on tool holder 14. When tool holder 14 is coupled into spindle head 12, spindle head 12 runs as usually with slow speed, the so-called coupling speed, until the tenon block enters the groove. In that way, tool holder 14 is, in circumferential direction, fixed in an indexed position.

Clamping jaw 16 is, in its rear region 40, equipped with an inner thread 42, in which a draw-in rod 44 is screwed.

All elements mentioned before are essentially rotational symmetrically designed for what concerns axis 46 of spindle 10.

Draw-in bar 44 can be moved, in a way known per se, in the direction of axis 46, as indicated with an arrow 48.

Clamping arbor 18 is on its bottom end, in FIG. 1 and 2, somewhat thickened, whereby in the transition region to the thickening a first bevel 50 is provided. From first bevel 50, clamping jaw 16 then runs in axial direction upwards as a cylindrical region 52, in order to taper again over a second bevel 54.

If it is spoken of "bevel" in the present invention, these are, due to the essentially rotational symmetric design of the elements used, but at least due to the circular-arc shaped form to be understood as, preferably, conical surfaces, respectively.

Segments 60 rest on the cylindrical region 52 and the bevels 50 and 54 of clamping jaw 16 in the operation position shown in FIG. 1. Segments of this kind are known per se. In practice, a plurality of such segments are regularly arranged and distributed over an outer circumference of clamping arbor 18.

Segments 60 are, on their bottom end, equipped with a thickened head 62. On the inner side of head 62 a third bevel 64 is formed, which is formed complementary to first bevel 50. To the top of segments 60, a middle section 65 is adjoined, which is radially formed in a relatively thin way. Adjoining this middle section 65 is a guide section 66, which, in its turn, is radially designed in a thicker way.

Figure 3:
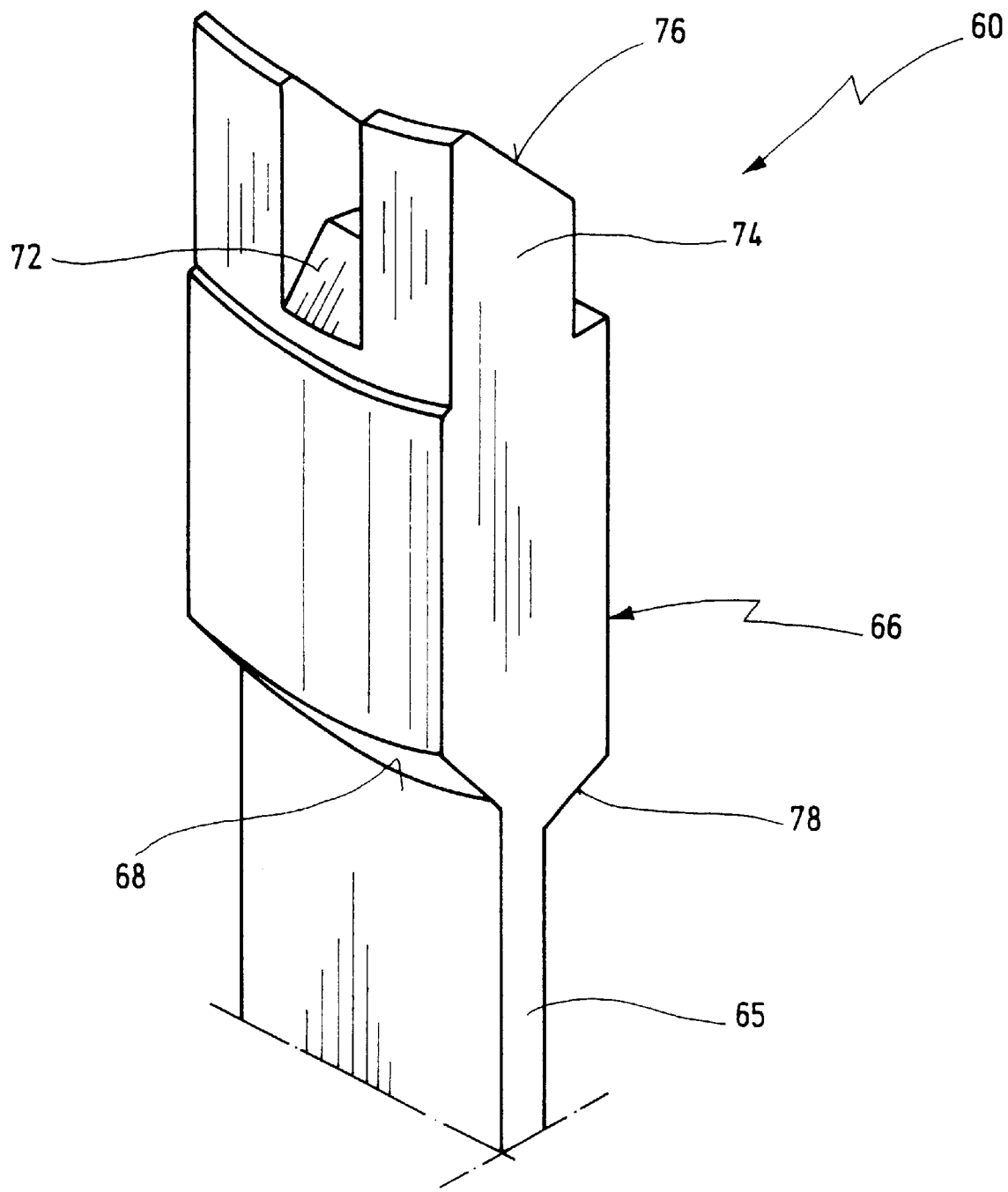
FIG. 3 shows in an enlarged scale and as perspective view a detail from a segment, as it is used in the spindle according to FIG. 1 and 2.

Guide section 66 is shown in FIG. 3 in an enlarged scale and in perspective in order to facilitate the understanding of the invention.

Guide section 66 has, according to that, a fourth bevel 68, which is located on the outer side of segments 60 and extends, in the embodiment shown, in axial direction to the top and outwards.

A fifth bevel 70 is provided in a complementary way on the housing of spindle head 12.

A sixth bevel 72 is provided on the top side of guide section 66, this sixth bevel 72 being directed diametrically to fourth bevel 68, i.e. to the top and inwards.

As already mentioned, several segments 60 are provided and distributed over the circumference of clamping arbor 18. Each segment 60 has, therefore, a circular-arc shaped form in the radial section. The upper part of guide section 66 is fork-like parted, the sixth bevel 72 already mentioned is located at the bottom of this fork (cf. FIG. 3), while on the right and on the left side of this sixth bevel 72 tine-like enlargements 74 extend to the top, which are equipped, on their upper side, with a seventh bevel 76. Seventh bevel 76, in its turn, is directed to the top and outwards.

Finally, on the inner bottom side of guide sections 66, an eighth bevel 78 is provided, which runs radially to the top and inwards. This eighth bevel is designed complementary in relation to second bevel 54 on the top end of clamping jaw 16.

In order to fix these segments 60 in circumferential direction and to achieve their axial guiding, a crown 80 is provided in the rear part of the receptacle opening of spindle head 12. Crown 80 is equipped, on its circumference, with axial slots, in which guide sections 66 of segments 60 engage and, partly, run within.

Crown 80 is, on its top, equipped with a cylindrical section 82, which runs in a complementary bore 84 at the upper end of the receptacle opening of spindle head 12.

Axially to the bottom crown 80 is formed by a plurality of first shoes 86. A readjusting spring 88 is held in axial direction between the rear side of the first shoes 86 and a pot 90, which forms the upper end of the receptacle bore in spindle head 12.

Axially to the bottom first shoes 86 are equipped with a ninth bevel 92, which is designed complementary in relation to sixth bevel 72.

Finally, in the axial region of crown 80, a bushing 96 is located, which is supported, axially to the top, firmly against pot 90. Bushing 96 is, on its bottom, equipped with a plurality of second shoes 98, which have, to the bottom, a tenth bevel 100. Tenth bevel 100 is designed complementary in relation to seventh bevel 76.

In the embodiment shown, bushing 96 is located on the inner side and crown 80 on the outer side. It is also possible, however, to exchange the functions in radial order and, according to that, put the crown radially inwards and the bushing radially outwards.

The functioning of spindle 10 is to be explained now:

As already mentioned above, FIG. 1 shows the state of spindle 10, in which tool holder 14 has not yet been clamped. Rather, tool holder 14 has merely been loosely inserted from the bottom into the receptacle opening of spindle head 12, until tool holder 14 and spindle head 12 lie adjacent to each other in radial plain 36.

It can distinctively be seen in FIG. 1 that segments 60 closely lie at the circumference of clamping jaw 16. The radial disturbing contour of clamping jaw 16 and segments 60 is, therefore, smaller than the inner diameter of neck 32.

Consequently, it is possible to insert the tool holder with its shaft or male taper 30 to the top into the receptacle opening of spindle head 12, clamping jaw 16 engaging then, with segments 60, into the second receptacle 28 on the upper end of tool holder 14.

In this state, spring 88 is released and crown 80 is positioned in a lower operation position. This is shown right at the top in FIG. 1 with distance D, which is kept by the rear end of cylindrical section 82 of crown 80 from the top end of the receptacle bore in spindle head 12.

To clamp tool holder 14 in spindle head 12, draw-in rod 44 is now pulled to the top in the direction of arrow 48.

This draw movement has the effect that segments 60 are shifted axially relatively to clamping arbor 18. Segments 60 namely are relatively movable to clamping arbor 18. If, now, clamping arbor 18 is pulled to the top, thickened heads 62 of segments 60 slide over the guiding of bevels 50/64 onto the thickened bottom end of clamping arbor 18 and, thus, radially outwards. As a result, thickened heads 62 lay themselves into the undercut 33 and, thus, fix tool holder 14 in spindle head 12.

At the same time, segments 60 are moved outwards also on their upper ends. Same is done, on the one hand, in that clamping arbor 18 runs via second bevel 54 at its axially rear end on eighth bevel 78 at the bottom and inner end of guide section 66 and, at the same time, gets into contact with its fourth bevel 68 located at the bottom and outwards with fifth bevel 70 in the housing of spindle head 12.

At the same time, over another guiding formed by sixth bevel 72 together with ninth bevel 92, crown 80 is pushed axially to the top, against the force of spring 88. Distance D (FIG. 1) kept on the rear end of cylindrical section 82 is, thus, diminished to d (FIG. 2).

Spindle 10 is now located in the second operation position according to FIG. 2, in which tool holder 14 is firmly clamped in spindle head 12.

If, now, for a succeeding detaching process, draw-in rod 44 is pressed down again, as indicated with arrow 102 in FIG. 2, this first means only that clamping jaw 16 is axially shifted to the bottom.

To achieve that segments 60 return from operation position according to FIG. 2 to operation position according to FIG. 1, spring 88 releases and presses crown 80 down, whereupon segments 60 are moved, over the guiding of bevels 72/92, axially down and, at the same time, radially inwards.

Since that step known per se in the prior art does not always succeed without problems, as the bottom end of segments 60, in particular thickened heads 62, may definitely rest in an interposition, an additional guiding is provided, according to the invention, that acts in the first operation position according to FIG. 1 as well as in all interpositions up to the second operation position according to FIG. 2.

This further guiding is formed by seventh bevel 76 together with tenth bevel 100.

As can namely be clearly seen in FIG. 1 and 2, this guiding is during the whole working cycle between the two operation positions in engagement, whereby bushing 96, on which tenth bevel 100 is located, is axially firmly arranged.

As, when segments 60 return from the clamped operation position according to FIG. 2 into the detached operation position according to FIG. 1 the feed force is raised over guiding 72/92, the further guiding 76/100 is directed, for stabilization, vice versa, so that in that way an undesired movement in radial direction of segments 60 is avoided. Guiding 72/92 namely lies on a cone, which opens to the bottom, while additional guiding 76/100 defines a cone, which opens to the top.

We claim:

1. A spindle in a machine tool, said spindle having an axis, a receptacle arranged in the axis and provided for receiving a shaft of a tool holder, and a clamping mechanism for axial fixation of the shaft in the receptacle, the clamping mechanism comprising an axially movable clamping arbor with a circumference, at least one segment arranged at said circumference and having at least a first and a second radial operation position, whereby said at least one segment fixes said shaft positively in said receptacle when being in the first radial operation position, first guiding means acting between the clamping arbor and the at least one segment such that upon axial movement of the clamping arbor the at least one segment is radially transferred between said first and second radial operation positions, and second guiding means arranged for holding said at least one segment in a definite way when being in said second radial operation position or in any interposition between said first and second radial operation positions.

2. The spindle of claim 1, wherein said at least one segment has a first and a second axial end, whereby said first guiding means act upon said first and said second axial ends and the second guiding means act upon the first axial end of the segment.

3. The spindle of claim 2, wherein said first axial end is facing away from the receptacle.

4. The spindle of claim 2, wherein said first guiding means acts in the second radial operation position only upon the first axial end of said at least one segment.

5. The spindle of claim 1, wherein said first and second guiding means are arranged as oblique guidings.

6. The spindle of claim 5, wherein said at least one segment has an essentially circular-arc shaped form in the radial section and said oblique guidings are formed by conical bevels.

7. The spindle of claim 1, wherein a plurality of segments is arranged and distributed over said outer circumference of the clamping arbor.

8. The spindle of claim 3, wherein a plurality of segments is arranged and distributed over said outer circumference of the clamping arbor.

9. The spindle of claim 8, wherein said segments are held at their respective first ends in a common crown, said crown being equipped with first conical bevels acting together with second conical bevels provided on the segments, said first and second conical bevels forming said first guiding means.

10. The spindle of claim 9, wherein said crown is axially clamped against the force of a spring.

11. The spindle of claim 10, wherein said spring is relaxed in the second radial operation position.

12. The spindle of claim 10, wherein said crown has a cylindrical section which holds the spring as well as a plurality of axially protruding shoes, said first conical bevels being provided at said shoes.

13. The spindle of claim 8, wherein in the axial region of the crown a bushing is arranged coaxial in relation to said crown, and said bushing is equipped with third conical bevels which act together with fourth conical bevels on the segments, said third and fourth conical bevels forming said second guiding means.

14. The spindle of claim 13, wherein said first and second conical bevels are inclined diametrically to said third and fourth conical bevels, respectively.

15. The spindle of claim 13, wherein said bushing is axially arranged in a fixed way.

16. The spindle of claim 13, wherein said crown is arranged radially outside of said bushing.

17. The spindle of claim 16, wherein said crown is guided in a bore of said spindle.

18. The spindle of claim 13, wherein said crown is radially inside of said bushing.

* * * * *